(12) United States Patent
Yoshima et al.

(10) Patent No.: US 12,345,297 B2
(45) Date of Patent: Jul. 1, 2025

(54) CAGE FOR ROLLING BEARING AND ROLLING BEARING INCORPORATING CAGE

(71) Applicant: NSK LTD., Tokyo (JP)

(72) Inventors: Taiki Yoshima, Kanagawa (JP); Yoshitaka Naganuma, Kanagawa (JP)

(73) Assignee: NSK LTD., Tokyo (JP)

(\*) Notice: Subject to any disclaimer, the term of this patent is extended or adjusted under 35 U.S.C. 154(b) by 0 days.

(21) Appl. No.: 18/282,937

(22) PCT Filed: Jan. 25, 2023

(86) PCT No.: PCT/JP2023/002322
§ 371 (c)(1),
(2) Date: Sep. 19, 2023

(87) PCT Pub. No.: WO2023/157592
PCT Pub. Date: Aug. 24, 2023

(65) Prior Publication Data
US 2024/0167512 A1    May 23, 2024

(30) Foreign Application Priority Data
Feb. 17, 2022 (JP) .................. 2022-022921

(51) Int. Cl.
*F16C 33/04* (2006.01)
*F16C 19/06* (2006.01)
(Continued)

(52) U.S. Cl.
CPC .............. *F16C 33/44* (2013.01); *F16C 19/06* (2013.01); *F16C 33/416* (2013.01);
(Continued)

(58) Field of Classification Search
CPC .. F16C 19/06; F16C 33/3856; F16C 33/3875; F16C 33/416; F16C 33/44;
(Continued)

(56) References Cited

U.S. PATENT DOCUMENTS

2010/0316315 A1   12/2010  Shimazu et al.
2013/0301965 A1   11/2013  Himeno et al.
(Continued)

FOREIGN PATENT DOCUMENTS

EP    2530341 A1   12/2012
EP    3 677 662 A1   7/2020
(Continued)

OTHER PUBLICATIONS

International Search Report (PCT/ISA/210) issued Mar. 14, 2023 by the International Searching Authority in counterpart International Patent Application No. PCT/JP2023/002322.
(Continued)

*Primary Examiner* — Phillip A Johnson
(74) *Attorney, Agent, or Firm* — Sughrue Mion, PLLC

(57) ABSTRACT

Provided are: an environment-friendly synthetic resin cage that uses a 100% biomass raw material and therefore aims for carbon neutrality while having performance as a bearing in a conventional process; and a rolling bearing incorporating said cage. A crown-type cage for holding a plurality of rolling elements incorporated between an inner ring and an outer ring is produced with a polyamide resin composition containing a 100% biomass-derived raw material with a reinforcing material contained therein, wherein the raw material is polyamide 410 and 10-40 wt % of the reinforcing material is contained therein.

7 Claims, 1 Drawing Sheet

(51) Int. Cl.
*F16C 33/41* (2006.01)
*F16C 33/44* (2006.01)
*F16C 33/66* (2006.01)
*F16C 33/78* (2006.01)

(52) U.S. Cl.
CPC .......... *F16C 33/6603* (2013.01); *F16C 33/78* (2013.01); *F16C 2208/04* (2013.01); *F16C 2208/60* (2013.01)

(58) Field of Classification Search
CPC .................. F16C 33/4635; F16C 33/4652; F16C 33/498; F16C 33/56; F16C 2208/04; F16C 2208/60; F16C 33/6603; F16C 33/6607; F16C 33/78
See application file for complete search history.

(56) References Cited

U.S. PATENT DOCUMENTS

| | | | |
|---|---|---|---|
| 2015/0298725 A1* | 10/2015 | Kichikawa | B62D 5/0409 180/446 |
| 2017/0348881 A1* | 12/2017 | Hayashi | C08K 7/14 |
| 2023/0174782 A1 | 6/2023 | Takahashi | |

FOREIGN PATENT DOCUMENTS

| | | |
|---|---|---|
| EP | 4223859 A1 | 8/2023 |
| EP | 4372240 A1 | 5/2024 |
| JP | 2009-197938 A | 9/2009 |
| JP | 2009-204121 A | 9/2009 |
| JP | 2011-153699 A | 8/2011 |
| JP | 2013-167295 A | 8/2013 |
| JP | 2019-44061 A | 3/2019 |
| JP | 2020-111636 A | 7/2020 |
| WO | 2021/215264 A1 | 10/2021 |

OTHER PUBLICATIONS

Written Opinion (PCT/ISA/237) issued Mar. 14, 2023 by the International Searching Authority in counterpart International Patent Application No. PCT/JP2023/002322.
European Search Report issued in EP Appln No. 23756120.4 dated May 16, 2025.

* cited by examiner

CAGE FOR ROLLING BEARING AND ROLLING BEARING INCORPORATING CAGE

CROSS-REFERENCE TO RELATED APPLICATIONS

This application is a National Phase Entry of PCT International Application No. PCT/JP2023/002322 filed on Jan. 25, 2023, which claims priority to Japanese Patent Application No. 2022-022921 filed on Feb. 17, 2022, the contents of all of which are incorporated herein by reference in their entirety.

TECHNICAL FIELD

The present invention relates to an improvement of a synthetic resin-made cage to be incorporated in a rolling bearing and a rolling bearing incorporating the synthetic resin-made cage.

BACKGROUND ART

In the related art, synthetic resin-made cages that constitute rolling bearings are most often made of a polyamide 66 resin reinforced with a glass fiber. The polyamide 66 resin is derived from petroleum, and carbon dioxide is generated during the production and disposal of this type of synthetic resin-made cage made of the polyamide 66 resin, which imparts a load on the environment, and thus environmental conservation is not taken into consideration.

In recent years, the concentration of carbon dioxide, which is a greenhouse gas, in the atmosphere has been increasing year by year, which is one of the major issues that must be solved globally since it is one of the causes of climate change problems represented by global warming.

As one of the means to solve this problem, biomass plastic products in which a "biomass"-derived material as a renewable resource is utilized have been widely proposed instead of plastic products that are formed using fossil resources that are in danger of depletion. The "biomass plastic" is defined as "a polymer material including substances derived from renewable organic resources as raw materials and obtained by chemically or biologically synthesis" (Japan BioPlastics Association (JBPA)).

In Japan, various companies have been making efforts to achieve SDGs (Sustainable Development Goals).

Therefore, a technique using a "biomass"-derived material has already been proposed (Patent Literature 1) because it is preferable to use a resin material having a low environmental load during production or disposal as the resin material constituting this type of synthetic resin-made cage.

However, in Patent Literature 1, although a proportion of using the biomass-derived material is disclosed, some of raw materials include "partial biomass plastics" containing petroleum-derived raw materials, and although the environmental load is lower than that of general plastics, it is incomplete as an initiative toward SDGs.

CITATION LIST

Patent Literature

Patent Literature 1: JP2009-197938A

SUMMARY OF INVENTION

Technical Problem

The present invention has been made to solve such problems in the related art, and an object thereof is to provide an environmentally friendly synthetic resin-made cage which is formed using a 100% biomass raw material, has performance as a bearing in a related-art process, and aims for carbon neutrality, and a rolling bearing incorporating the cage.

Solution to Problem

In order to achieve this object, a first aspect of the present invention relates to a cage for a rolling bearing including a reinforcing material in a 100% biomass-derived raw material.

A second aspect of the present invention relates to the cage for the rolling bearing according to the first aspect of the present invention, in which the raw material is polyamide 410, and the cage is made of a polyamide resin composition containing 10 wt % to 40 wt % of the reinforcing material in the polyamide 410.

A third aspect of the present invention relates to the cage for the rolling bearing according to the second aspect of the present invention, in which the polyamide 410 is composed of tetramethylenediamine and sebacic acid, which are plant-derived raw materials.

A fourth aspect of the present invention relates to the cage for the rolling bearing according to the third aspect of the present invention, in which the reinforcing material is a glass fiber having an average fiber diameter of 13 μm.

A fifth aspect of the present invention relates to a rolling bearing including:
an inner ring and an outer ring disposed to be relatively rotatable;
a plurality of rolling elements incorporated between the inner ring and the outer ring; and
a cage configured to retain the rolling elements, in which the cage is the cage according to any one of the first aspect of the present invention to the fourth aspect of the present invention.

A sixth aspect of the present invention relates to the rolling bearing according to the fifth aspect of the present invention, in which a lubricant is enclosed in a bearing internal space formed between the inner ring and the outer ring, and the lubricant is a grease containing an ester-based base oil as a main component.

A seventh aspect of the present invention relates to the rolling bearing according to the fifth aspect of the present invention or the sixth aspect of the present invention, in which a sealing member is provided between the inner ring and the outer ring to seal a bearing internal space.

Advantageous Effects of Invention

According to the present invention, it is possible to provide an environmentally friendly synthetic resin-made cage which has performance as a bearing in a related-art process and aims for carbon neutrality, and a rolling bearing incorporating the cage.

DESCRIPTION OF EMBODIMENTS

Figure 1A:
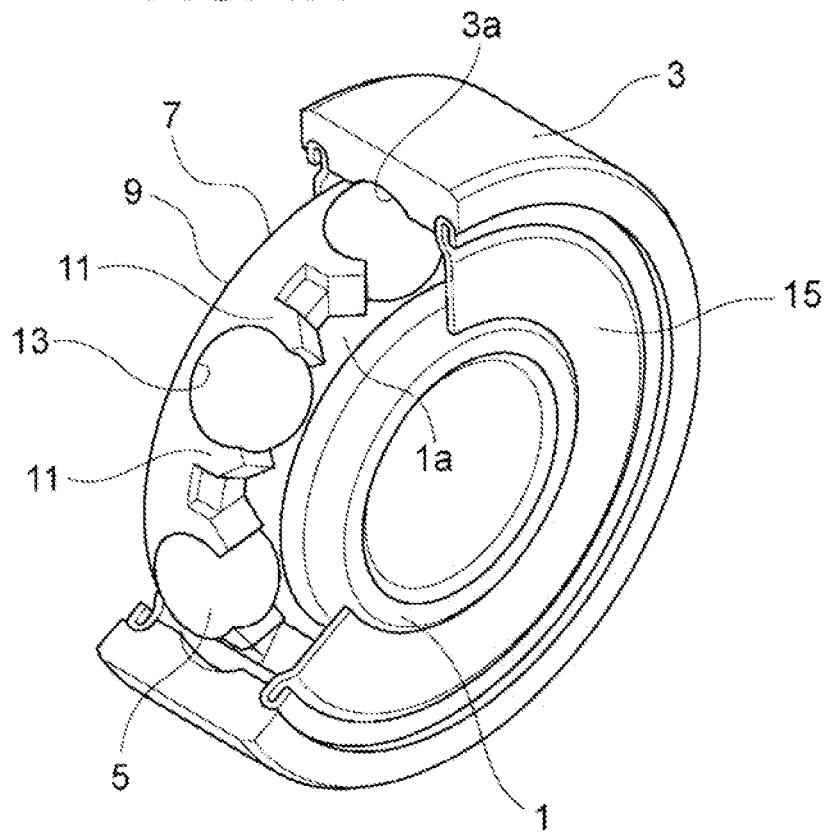
FIG. 1A is a schematic perspective view showing a rolling bearing according to one embodiment of the present invention with a part cut away.
Figure 1B:
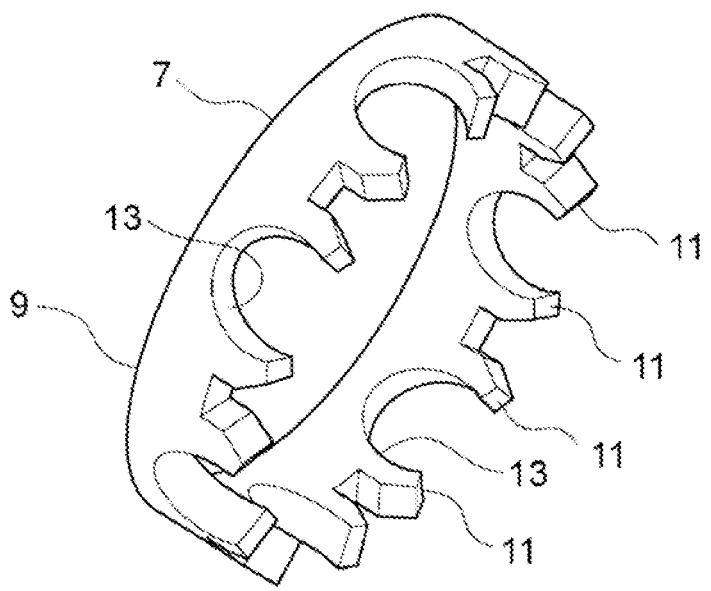
FIG. 1B is a schematic perspective view showing a synthetic resin-made cage according to one embodiment of the present invention.

An embodiment of a synthetic resin-made cage for a rolling bearing according to the present invention and a rolling bearing incorporating the cage will be described below. The present embodiment is merely one embodiment of the present invention and is not to be construed as being limited in any way, and can be appropriately modified in design within the scope of the present invention.

In the present embodiment, for example, a deep groove ball bearing incorporated in an air conditioner fan motor or the like is assumed.

The deep groove ball bearing includes an inner ring 1 having a rolling surface 1a on a circumferential surface thereof, an outer ring 3 having a rolling surface 3a on an inner circumferential surface thereof, a plurality of rolling elements (balls) 5 interposed between the rolling surfaces 1a and 3a, a cage 7 made of a synthetic resin for retaining the plurality of rolling elements 5, a sealing member 15 disposed between the inner ring 1 and the outer ring 3 to seal a bearing internal space, and a lubricant (not shown) enclosed in the bearing internal space, and the cage 7 is a rolling element guide.

In the present embodiment, the cage 7 is a crown-shaped cage made of a synthetic resin. The crown-shaped cage 7 includes: a main portion 9 formed in a short cylindrical shape; a pair of claw portions 11, 11 provided on one side of the main portion 9 in a cylinder center axis direction, a plurality of the pair of claw portions 11, 11 being provided at predetermined intervals in a circumferential direction of the main portion 9; and a pocket 13 for retaining the rolling element 5 in a rollable manner and formed between each pair of claw portions 11, 11.

The crown-shaped cage according to the present embodiment is one embodiment, and other general crown-shaped cages can be employed within the scope of the present invention. In addition, in the present embodiment, a crown-shaped cage is described, but the cage is not limited to this, and other types of cages made of a synthetic resin can be modified in design within the scope of the present invention. Further, the sealing member 15 is not limited to the illustrated form, and a general shield plate, rubber seal, or the like to be incorporated in a rolling bearing can be appropriately modified in design within the scope of the present invention.

Here, the cage 7, which is a characteristic configuration of the present invention, will be described in detail.

The cage 7 contains a reinforcing material in a 100% biomass-derived raw material. In the present embodiment, for example, it is produced by injection molding with a polyamide resin composition containing polyamide 410 (PA410) and a reinforcing material in a content of 10 wt % to 40 wt %. This is because, in this type of cage, since claws of the cage are thin, it is often possible to suppress cracking and whitening during ball incorporation by reducing the content of the reinforcing material.

The polyamide 410 resin used as a base resin for forming the synthetic resin-made cage 7 in each of the above embodiments is originally a polycondensation product of petroleum-derived tetramethylenediamine (1,4-diaminobutane, butanediamine) and sebacic acid derived from a plant-derived castor oil, but tetramethylenediamine also evolved into a plant-derived material made from wood chips.

The polyamide 410 is synthesized by reacting the two plant-derived raw materials, i.e., tetramethylenediamine and sebacic acid, and has a biomass degree of 100%. It is a very environmentally friendly material (carbon-neutral) compared to a material having a biomass degree of 70% and using petroleum-derived tetramethylenediamine.

The polyamide 410 has a water absorption rate of 5.8% (23° C., in water, 2 weeks), which is reduced to about 73% compared to a water absorption rate of 8% (23° C., in water, 2 weeks) of polyamide 66 most commonly used for cages for the rolling bearing, and thus has a small dimensional change due to water absorption and has improved reliability due to excellent dimensional stability.

The polyamide 410 has a molecular weight in a range that allows injection molding in a state containing a reinforcing material such as a glass fiber, specifically, in a range of 13,000 to 28,000 in terms of a number average molecular weight, and more preferably in a range of 18,000 to 26,000 in terms of a number average molecular weight considering fatigue resistance and moldability. When the number average molecular weight is less than 13,000, the molecular weight is too low, the fatigue resistance is poor and the practicality is low. On the other hand, in a case where the number average molecular weight is more than 28,000, when a preferred content of the reinforcing material such as a glass fiber is 15 wt % to 35 wt %, the melt viscosity becomes too high, making it difficult to produce the cage with high accuracy by injection molding, which is not preferred.

The polyamide 410 exhibits a certain level of durability even when used alone as a resin, works well against wear of a mating member (rolling element and outer ring) with which the cage may come into contact, and functions sufficiently as a cage. However, when it is used under severer use conditions, it is also assumed that the cage is damaged, deformed, or worn. Therefore, it is preferable to blend a reinforcing material in order to further increase the reliability.

The reinforcing material is preferably a glass fiber, a carbon fiber, an aramid fiber, a potassium titanate whisker, an aluminum borate whisker, or the like. Considering adhesiveness with the above polyamide resin, a reinforcing material subjected to a surface treatment with a silane coupling agent or the like is more preferred. These reinforcing materials can be used in combination of multiple types.

Considering impact strength, it is preferable to blend a fibrous material such as a glass fiber or a carbon fiber, and further, considering damage to the mating material, it is preferable to blend a whisker-like material in combination with the fibrous material. In the case of mixed use, the mixing ratio varies depending on the types of the fibrous material and the whisker-like material, and is appropriately selected considering the impact strength, the damage to the mating material, or the like.

As the glass fiber, for example, those generally having an average fiber diameter of 10 μm to 13 μm, those having an average fiber diameter of 5 μm to 7 μm that can increase strength and improve wear resistance with a small content, or those having an irregular cross section are more preferred.

As the carbon fiber, for example, PAN-based ones are preferred if priority is given to strength, but pitch-based ones, which are advantageous in terms of cost, can be used. Those having an average fiber diameter of 5 μm to 15 μm are preferred. Since the carbon fiber itself has high strength and high elastic modulus, it is possible to increase the strength and elastic modulus of the cage compared to the glass fiber.

As the aramid fiber, for example, a para-aramid fiber having excellent reinforcing properties can be preferably used. Those having an average fiber diameter of 5 µm to 15 µm are preferred. Unlike the glass fiber and the carbon fiber, the aramid fiber does not damage a steel material and therefore does not deteriorate the surface condition of the mating member with which the cage comes into contact. Therefore, the aramid fiber is more preferred when acoustic characteristics of the bearing are important.

These reinforcing materials are preferably blended in a proportion of 10 wt % to 40 wt %, particularly 15 wt % to 30 wt %. A blending amount of the reinforcing material of less than 10 wt % is not preferred since an improvement in mechanical strength is unfavorable. A blending amount of the reinforcing material of more than 40 wt % is not preferred since the moldability decreases and depending on the type of the reinforcing material, the damage to the mating material increases.

Further, in order to suppress deterioration due to heat during molding and use, it is preferable to add an iodide-based heat stabilizer or an amine-based antioxidant as an additive to the resin, either singly or in combination.

Compared to the polyamide 66 commonly used in cages for the rolling bearing, the polyamide 410 has a C10 (sebacic acid-derived) moiety having a long hydrocarbon chain between amide groups, and thus has excellent wettability with a poly-α-olefin oil.

In addition, a grease can also contain 0% to 40% of a thickening agent. The thickening agent can be selected within the range described above.

Other additives can also be added to this grease. Examples of the additives include antioxidants such as amines and phenols, rust inhibitors such as Ca sulfonate, extreme pressure additives such as MoDTC, and oiliness improvers such as montan acid ester wax, a montan acid ester partially saponified wax, a polyethylene wax, and oleic acid.

Specifically, as shown in Table 1, a polyamide resin composition (resin pellet) can be prepared by blending a polyamide resin and a reinforcing material (glass fiber GF).

TABLE 1

| Resin Composition of Cage | | |
|---|---|---|
| | Example | Comparative Example |
| Base resin | Polyamide 410 | Polyamide 66 70 wt % |
| Reinforcing material | GF treated with silane coupling agent (average fiber diameter: 13 µm), 30 wt % | GF treated with silane coupling agent (average fiber diameter: 13 µm), 30 wt % |
| Melting point (° C.) | 250 | 265 |
| Biomass degree (%) | 100 | 0 |

Example: polyamide 410 resin containing 30 mass % of GF (EcoPaXX (registered trademark) Q-HG6 manufactured by DSM, heat stabilizer-containing grade, average molecular weight unknown)

Comparative Example: polyamide 66 resin containing 30 mass % of GF (Ultramid (registered trademark) A3HG6 manufactured by BASF, heat stabilizer-containing grade, average molecular weight unknown)

Using the resin pellet shown in Table 1, the synthetic resin-made crown-shaped cage 7 for a deep groove ball bearing according to the present embodiment can be prepared by injection molding.

The sealing member 15 to be incorporated in the rolling bearing according to the present embodiment can also be prepared using the 100% biomass-derived raw material described above.

INDUSTRIAL APPLICABILITY

The present invention can be generally used for rolling bearings in which synthetic resin-made cages are incorporated, and can be generally used for cages for the rolling bearing.

Although various embodiments have been described above, it goes without saying that the present invention is not limited to such examples. It is apparent for those skilled in the art to which the present invention belongs that various modified examples or corrected examples are conceivable within the scope recited in the claims, and it is understood that the above falls within the technical scope of the present invention. In addition, within the scope not departing from the gist of the invention, each of the configuration elements in the above embodiments may be combined in any manner.

REFERENCE SIGNS LIST 1 inner ring
3 outer ring
5 rolling element
7 cage (crown-shaped cage)
13 pocket
15 sealing member

The invention claimed is:

1. A cage for a rolling bearing comprising:
   a reinforcing material in a 100% biomass-derived raw material,
   wherein the raw material is polyamide 410.

2. The cage for the rolling bearing according to claim 1, wherein the cage is made of a polyamide resin composition containing 10 wt % to 40 wt % of the reinforcing material in the polyamide 410.

3. The cage for the rolling bearing according to claim 2, wherein the polyamide 410 is composed of tetramethylenediamine and sebacic acid, which are plant-derived raw materials.

4. The cage for the rolling bearing according to claim 3, wherein the reinforcing material is a glass fiber having an average fiber diameter of 13 µm.

5. A rolling bearing comprising:
   an inner ring and an outer ring disposed to be relatively rotatable;
   a plurality of rolling elements incorporated between the inner ring and the outer ring; and
   a cage configured to retain the rolling elements, wherein the cage is the cage according to claim 1.

6. The rolling bearing according to claim 5, wherein a lubricant is enclosed in a bearing internal space formed between the inner ring and the outer ring, and the lubricant is a grease containing an ester-based base oil as a main component.

7. The rolling bearing according to claim 5, wherein a sealing member is provided between the inner ring and the outer ring to seal a bearing internal space.

* * * * *